(12) United States Patent
Kaliappan et al.

(10) Patent No.: US 8,771,778 B2
(45) Date of Patent: Jul. 8, 2014

(54) STABILIZED FOAM

(75) Inventors: Siva Kaliappan, Plano, TX (US); Ian Noble, Bedford (GB); Ian T. Norton, Rushden (GB); Sevugan Palaniappan, Plano, TX (US)

(73) Assignee: Frito-Lay Trading Company, GmbH, Berne (CH)

( * ) Notice: Subject to any disclaimer, the term of this patent is extended or adjusted under 35 U.S.C. 154(b) by 551 days.

(21) Appl. No.: 12/878,154

(22) Filed: Sep. 9, 2010

(65) Prior Publication Data

US 2012/0064199 A1    Mar. 15, 2012

(51) Int. Cl.
*A23L 1/05*   (2006.01)
*A23L 1/052*  (2006.01)
*A23L 1/054*  (2006.01)
*A23L 1/056*  (2006.01)

(52) U.S. Cl.
USPC .............................. 426/564; 426/89; 426/573

(58) Field of Classification Search
CPC ......... A23L 1/0097; A23L 1/05; A23L 1/052; A23L 1/0522; A23L 1/0524; A23L 1/0526; A23L 1/053; A23L 1/0532; A23L 1/054; A23L 1/0541; A23L 1/0545; A23L 1/056; A23L 1/0562; A23L 1/05625; A23J 3/00; A23P 1/16; A23G 9/46
USPC ......................................................... 426/564
See application file for complete search history.

(56) References Cited

U.S. PATENT DOCUMENTS

| 2,844,468 A | 7/1958 | Gunther |
| 3,118,958 A | 1/1964 | White |
| 3,334,052 A * | 8/1967 | Kurz et al. ............... 516/105 |
| 3,936,391 A | 2/1976 | Gabby |
| 4,158,685 A * | 6/1979 | Masaryk .................... 264/43 |
| 4,409,248 A | 10/1983 | Lehnhardt |
| 4,689,238 A | 8/1987 | Hitchner |
| 4,923,981 A | 5/1990 | Weibel |
| 5,215,777 A | 6/1993 | Asher |
| 5,345,781 A | 9/1994 | Fels |
| 5,591,471 A | 1/1997 | Niwano |
| 5,620,732 A | 4/1997 | Clemmings |
| 5,670,094 A | 9/1997 | Sasaki |
| 5,713,209 A | 2/1998 | Hunchar |

(Continued)

FOREIGN PATENT DOCUMENTS

DE    10127075 A1    12/2002
EP     0537999 A2    4/1993

(Continued)

OTHER PUBLICATIONS

Kestin, J., Sokolov, M., and Wakeham, W. A., "Viscosity of Liquid Water in the Range -8° C. to 150° C.", J. Phys. Chem. Ref. Data, vol. 7, No. 3 (1978) 941-948.*

*Primary Examiner* — Humera Sheikh
*Assistant Examiner* — Jeffrey Mornhinweg
(74) *Attorney, Agent, or Firm* — James R. Gourley; Colin P. Cahoon; Carstens & Cahoon, LLP

(57) ABSTRACT

The present invention comprises a gel-stabilized foam for use in food products. Foam bubbles are stabilized by either a continuous gel coating or a particulate gel coating created under high shear conditions. The foam is viscous and shelf-stable, and can be combined with a viscous food product to lower its caloric density and improve its organoleptic properties.

16 Claims, 2 Drawing Sheets

(56) References Cited

U.S. PATENT DOCUMENTS

| | | | |
|---|---|---|---|
| 5,919,510 A | 7/1999 | Fayard et al. | |
| RE36,390 E | 11/1999 | Fels | |
| 6,010,734 A | 1/2000 | Whelan | |
| 6,117,473 A | 9/2000 | Leshik | |
| 6,228,412 B1 | 5/2001 | Groux | |
| 6,350,594 B1 | 2/2002 | Clarke | |
| 6,368,652 B1 | 4/2002 | Heertje | |
| 6,436,460 B1 | 8/2002 | Daniel | |
| 6,491,960 B1 | 12/2002 | Daniel | |
| 6,497,913 B1 | 12/2002 | Gray | |
| 6,511,694 B2 | 1/2003 | Huang | |
| 6,558,729 B1 | 5/2003 | Riviere | |
| 6,565,908 B1 | 5/2003 | Daniel | |
| 6,596,333 B1 | 7/2003 | Vaghela | |
| 6,890,577 B2 | 5/2005 | Vaghela | |
| 7,147,885 B2 | 12/2006 | Asano | |
| 7,591,452 B2 | 9/2009 | Kohama | |
| 2001/0041211 A1 | 11/2001 | Beeson | |
| 2003/0008059 A1* | 1/2003 | Macinnes et al. | 426/590 |
| 2003/0072779 A1 | 4/2003 | Sato | |
| 2005/0037111 A1 | 2/2005 | Berry | |
| 2005/0123666 A1 | 6/2005 | Vaghela | |
| 2005/0163904 A1 | 7/2005 | Walker | |
| 2006/0062883 A1* | 3/2006 | Hanselmann et al. | 426/564 |
| 2006/0128815 A1 | 6/2006 | Clare | |
| 2007/0116848 A1* | 5/2007 | Aldred et al. | 426/564 |
| 2007/0154558 A1* | 7/2007 | Gaserod et al. | 424/488 |
| 2007/0275131 A1 | 11/2007 | Bertini | |
| 2009/0010983 A1 | 1/2009 | Melvik | |
| 2009/0263555 A1 | 10/2009 | Tapfer | |
| 2009/0311406 A1 | 12/2009 | Tapfer | |
| 2009/0312213 A1 | 12/2009 | Tanaka | |
| 2009/0323459 A1 | 12/2009 | Windhab | |
| 2009/0325780 A1 | 12/2009 | Gauckler | |
| 2010/0055266 A1 | 3/2010 | Windhab | |
| 2010/0189857 A1 | 7/2010 | Blijdenstein | |
| 2010/0193305 A1 | 8/2010 | Suciu | |
| 2010/0310746 A1 | 12/2010 | Leser | |

FOREIGN PATENT DOCUMENTS

| | | | |
|---|---|---|---|
| EP | 1284106 A2 | 2/2003 | |
| EP | 1319435 A2 | 6/2003 | |
| EP | 1284106 A3 | 3/2004 | |
| EP | 1520485 A1 | 4/2005 | |
| EP | 1520484 A1 | 6/2005 | |
| GB | 694918 | 7/1953 | |
| WO | WO 9412063 A1 * | 6/1994 | |
| WO | 95/35035 A1 | 12/1995 | |
| WO | 01/45830 A1 | 6/2001 | |
| WO | 2010/067059 A1 | 6/2010 | |

* cited by examiner

STABILIZED FOAM

BACKGROUND OF THE INVENTION

1. Technical Field

The present invention generally relates to a viscous, shelf stable foam comprising foam particles and a viscous aerated foods incorporating the foam particles.

2. Description of the Related Art

A foam is a collection of gas bubbles trapped in a solid or liquid product. In general, foam stability—the ability of the gas bubbles that make up the foam to remain polydisperse in the foaming medium—varies directly with the viscosity of the bulk phase foaming medium. In other words, a foam created in a low viscosity liquid will be highly unstable and only last for a few seconds, while a foam created in a solid material can last for years.

Some food products contain foams. FIG. 1 depicts the relationship of viscosity to foam stability for foods containing foams that are known in the art. The bubbles that form in a glass of wine, for example, would be found in region 10 of FIG. 1, and last only a few seconds. Beer or cappuccino foam would also be found in region 10 of FIG. 1, and can last for minutes. A foam created by beating an egg white or a whipping cream would be found in region 20 of FIG. 1, and can last for hours. The bubbles created by yeast can give bread a foam quality that can last for days or weeks, which is depicted by region 30 of FIG. 1. Meringues, crackers, and other non-viscous foods which can incorporate foams that are beaten stiff and/or cooked, which fall into region 40 of FIG. 1, and that can last for years.

At present, a viscous, stable foam is unknown in the art. It would, therefore, be an advancement in the art to provide a viscous foam that is stable at ambient conditions, and which can be used to create viscous, aerated food products, which fall into region 50 of FIG. 1, heretofore unknown in the art.

SUMMARY OF THE INVENTION

The present invention provides a viscous shelf-stable foam that is unknown in the art. In one embodiment, a gel-stabilized foam particles are created by aerating a foaming agent and gelling agent solution under shear and gelling conditions. This foam comprises gel particles, each of which contain and stabilize a plurality of foam bubbles by coating them with a continuous gel coating.

In another embodiment, a foam is created by separately creating foam bubbles and gel particles under high shear, and combining the gel particles with the foam bubbles. The resulting foam contains foam bubbles with gel particles covering their outer surfaces in order to stabilize the foam.

Both foams are viscous and can be combined with viscous food products to provide reduced caloric density and improved organoleptic properties. Hence, this invention enhances the quality of viscous food products by providing aerated food products that are heretofore unknown in the art.

BRIEF DESCRIPTION OF THE DRAWINGS

A more complete understanding of the present invention may be had by reference to the following detailed description when taken in conjunction with the accompanying drawings, wherein.

Figure 1:
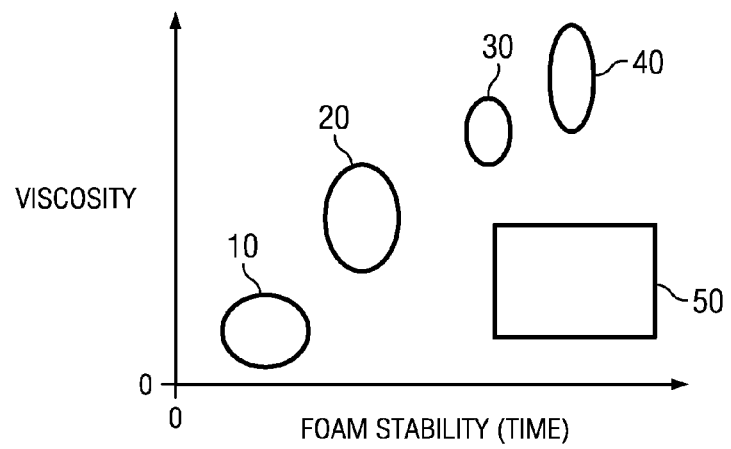
FIG. 1 depicts the relationship of viscosity and foam stability in foam-containing food products.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

DETAILED DESCRIPTION

The present invention is stable, viscous foam which can be used to make viscous, aerated food products which are shelf-stable. Specifically, the present invention produces gel-stabilized foam particles and bubbles which can be incorporated into viscous food products. Such aerated, viscous food products have unique organoleptic qualities and a lower caloric density than otherwise identical non-aerated food products.

A foam is created by introducing air or gas bubbles into a solution containing a foaming agent. Suitable foaming agents useful with the present invention include surface active proteins such as milk proteins, whey protein, soy protein, egg white protein, and their hydrolysates, derivatives of protein and carbohydrates referred to as protein conjugates (for example, lactosylated whey protein), and small molecular weight surfactants such as polygylcerol ester of fatty acids (PGE), distilled monoglycerides, mono and diglycerides, sodium steroyl lactylates and lactem, and combinations of individual foaming agents. Air or gas can be whipped or beaten into the foaming agent solution to create air bubbles in the bulk phase foaming solution, and thus produce a foam. Air can be used when oxidation of the foaming agent is of little or no concern. Other gasses such as carbon dioxide or nitrogen, can be used to prevent oxidation of the foaming agent and the food product the foam is combined with.

The stability of the foam is determined by how much drainage and disproportionation occurs, and how much temperature fluctuation and vibration is encountered during storage and transport. Drainage is loss of the bulk phase material, or lamella, between the bubbles, which leads to touching and flocculation of the bubbles, and eventually coalescence or merging of bubbles. Disproportionation is the diffusion of gas out of the bubbles, or between bubbles, due to pressure difference inside the bulk phase foaming medium. Temperature fluctuations and vibration can destabilize the foam structure by causing more drainage and disproportionation than would otherwise occur.

The foam of the present invention is a gel-stabilized foam. The gel-stabilized foam is stabilized using a gelling agent. Suitable gelling agents for use in the present invention include gellan gum, carrageenan, agar, pectin, alginate, gelatin, and combination gums such as xanthan and locust bean gum. Some proteins can be used as gelling agents, where the gelling mechanism can be triggered using enzymatic treatment or pH change.

There are two general approaches to creating the gel-stabilized foam of the present invention. The first approach involves producing gel-stabilized foam particles, in which a continuous gel coating stabilizes a plurality of foam bubbles within each foam particle. The second approach involves producing a gel-stabilized foam by coating foam bubbles with minute gel particles. Both approaches produce a viscous foam that is more stable at ambient conditions than viscous foams known in the art.

Figure 2:
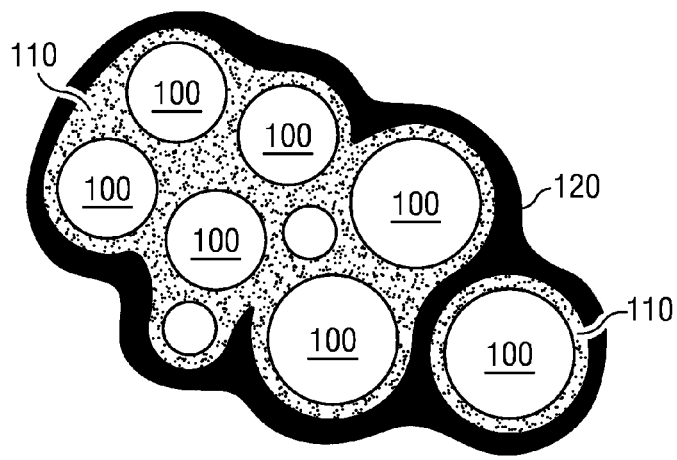
FIG. 2 depicts a gel-stabilized foam particle of one embodiment of the present invention.

FIG. 2 depicts a gel-stabilized foam particle made according to one embodiment of the present invention. Therein is depicted a plurality of air or gas bubbles 100, each of which is surrounded by a layer of foaming agent 110 (collectively, a foam bubble). The foam bubbles are surrounded by a continuous coating of gelling agent 120. Some adjacent foam bubbles inside each foam particle are separated by only a layer of foaming agent 110, while other adjacent bubbles have a boundary between them that also comprises a partial or complete gel layer 120. A foam particle created according to this embodiment of the present invention contains a plurality of such foam bubbles having a continuous gel coating on the exterior of the particle, and a gel-stabilized foam made according to this embodiment comprises a plurality of such foam particles. Additionally, although the foam bubbles depicted in FIG. 2 are generally circular shaped with an approximately even foaming agent and gel coating, other bubble shapes, sizes and coating thicknesses are possible.

Figure 4:
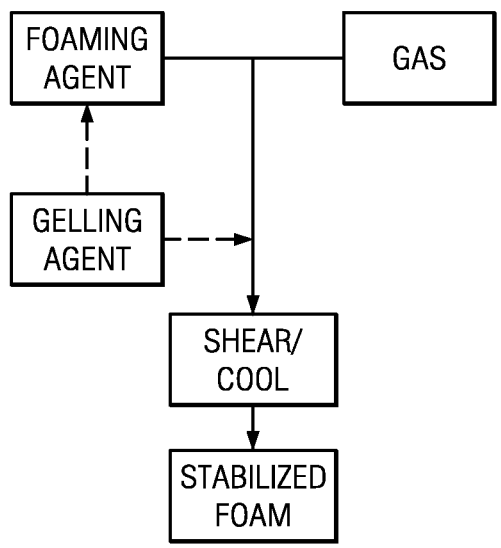
FIG. 4 is a flow chart depicting one embodiment of a method of making gel-stabilized, viscous foam particles according to the present invention.

FIG. 4 is a flow chart of one embodiment of a method for making a foam containing the foam particles depicted in FIG. 2. As depicted therein, a gelling agent is combined with a foaming agent, either before or after the foaming agent is combined with a gas. Whether the gelling agent is combined before or after the foaming agent is combined with the gas depends on whether there are interactions between the gelling agent and foaming agent which would make it preferable to create separate foaming agent and gelling agent solutions before combining them during aeration. For example, charge or hydrophobicity differences (as between hydrolyzed casein and gellan gum) can dictate such separate solution preparations. Also, ease of aeration needs to be taken into account, because the gelling agent can increase the viscosity of the solution, which in turn reduces the rate of adsorption of foaming agent on a bubble surface, thereby reducing intermediate bubble stability.

The solution resulting from the combination of foaming agent, gelling agent, and gas (no matter the order in which they are combined) is referred to as the foaming solution. In one embodiment, the weight percent of foaming agent in the foaming solution is between about 0.1% and 10%. In a preferred embodiment, it is between about 0.5% and 5%. In one embodiment, the weight percent of gelling agent in the foaming solution is between about 0.01% and 10%, and in a preferred embodiment, between about 0.5% and 3%. The foaming solution is then subjected to high shear while the gelling process is triggered.

In the embodiment depicted in FIG. 4, lowering the temperature of the mixture (cooling) triggers the gelling process. However, other gelling agents and triggering mechanisms can be used, whereby gelling is triggered by change in pH, enzymatic cross-linking, or ionic triggering. Foaming solutions containing gellan gum as the gelling agent can be triggered by injecting the solution into liquid nitrogen, cold water, or calcium chloride solution in order to create the gel-stabilized foam particles. The preferred triggering mechanism in this respect is calcium chloride solution. Foam particles created using calcium chloride solution as the triggering mechanism were washed with water, and remained stable for at least 12 days under ambient conditions. Calcium chloride (or other gel triggering agent) can also be added to the foaming solution or gelling solution before the two solutions are combined and released in a controlled manner to create gel coated foam particles.

In the embodiment depicted in FIG. 4, as the foaming solution cools under high shear, the gelling agent forms a continuous film coating on the outside of the foam bubbles, and is broken up into foamed gel particles. The gel coating helps prevent drainage and disproportionation by making the bubbles and the foam structure more rigid and air tight. The rate of shear encountered by the foaming solution needs to be at least sufficient to create gel-stabilized foam particles, and avoid the formation of a bulk gel, or gel particles so large that they are unable to be broken up into the small foam particles of the present invention. Also, it is necessary to apply shear for a time period extending beyond gelation point (in this case gelling temperature). If the shear rate is stopped before gelation point, then the particles will fuse together to form a solid gel. The particle size depends on the shear applied, generally higher the shear rate smaller the particles. Also, a higher shear rate will produce smaller bubbles and a more stable foam.

In one embodiment, the shear action takes place inside a rotor-stator system. Generally, a rotor-stator system is an enclosed, high shear mixer. An inlet introduces the foaming solution into the bottom of an enclosed mixing chamber. The chamber contains stationary baffles (or pins) and moving baffles (or pins), the interaction of which subjects the mixture to high shear forces. The shape of the baffles can be round, rectangular or any suitable shape. In the case of temperature mediated gelling, the enclosure is preferably cooled by an external fluid cooling jacket in order to trigger the gelling process. The gel-stabilized foam particles then exit at or near the top of the mixing chamber. The foaming process can be conducted in batch or continuous operations. The foaming and foam particle creation can also take place in other suitable devices such as rotation or stationary membranes, extrusion devices, and micro-fluidic devices (having micro channels). These devices allow precision controlling of aeration and narrow particle size distribution than rotor-stator systems.

During the mixing process, the process parameters that contribute to the quality and stability of the foam include, the concentration, pH, and ionic strength of the gelling and foaming agent, the flow rate through the mixer, the temperature of the inlet and outlet cooling streams, the rate of shear during mixing, the air/gas pressure, and the finished product outlet pressure.

The foaming agent concentration determines the short term stability of the foam. The bubble layer formed by the foaming agents should be viscoelastic enough to withstand shear forces before it is enrobed by gel material. The concentration and ionic strength of gelling agent determines the point of gelation and strength of the gel coating. For example, at lower concentration it forms a weaker, more viscous gel coating and at higher concentration it forms stronger, less viscous gel coating.

The pH of the foaming solution strongly influences both foaming and gelling characteristics of the agent and it is very specific. For example, whey protein foams well below pH 4.0 and above pH 5.5 but between pH 4.0-5.5 whey protein does not foam well due to neutralization of the charge. PGE produces the best foam at pH 3.0. In the case of gellan gum, a strong gel is formed at pH 4.0 and it decreases for both below and above pH 4.0. A similar effect is seen in the presence of ionic materials. The strength of the gel coating can be manipulated by choosing a particular foaming solution pH for each foaming agent.

The flow rate of the foaming solution through the high shear mixer determines the residence time, which in turn affects the kinetics (or rate) of bubble formation, gel formation and coating of bubbles with gel material. A balance needs to be achieved among these three activities to successfully make the gas filled gel particle foam.

The temperature of inlet and outlet streams determines the rate of cooling of the material inside the mixing chamber. In the case of temperature induced gelation this is very critical. For a given shear rate, a higher cooling rate will produce larger foam particles, and vice versa.

The shear rate has direct influence on the bubble and foam particle size formed. Higher shear rate produces smaller bubbles and foam particles. However extreme shear can cause de-mixing of the system which is system specific and can be determined empirically for each foaming solution.

In one embodiment, the viscosity of the gel-stabilized foam comprising the foam particles described above is between about 0.001 Pa·s and 200 Pa·s, measured using Anton Paar MCR 300 rheometer with probe CC27 at 1 inverse second shear rate and 20° C. The foam also has a volumetric gas fraction between 10% and 90% in one embodiment, between 20% and 80% in another embodiment, and in a preferred embodiment, has a gas fraction of between about 60% and 80%. The bubbles had a mean diameter of about 100 microns. The bubbles were generally spherical in nature and had diameter in the range of 20-200 microns where about 90% of the bubbles had diameters less than 100 microns. The gel-stabilized foam particle system was allowed to stand at room temperature and remained substantially stable for at least two weeks.

In order to study the foam particles individually, the foaming solution was injected using a standard 10 ml syringe into cold water or calcium chloride solution. The foam bubbles inside the foam particles so created had a mean diameter of about 20 microns and had a range of 0.5 to 50 microns. Also 90% of bubbles had diameter less than 30 microns. The foam particles created had mean diameter between about 0.5 and 10 millimeters (or between about 500 microns and 10,000 microns). When allowed to stand in a container at room temperature (approximately 20-25° C.), the gel stabilized foam particles surprisingly showed substantially no degradation (disproportionation, drainage, or substantial change in bubble size distribution), depending on the production parameters, and thus was stable, for more than 60 days, and in some embodiments more than 180 days. Such stable foam particles are unknown in the art.

In order to create smaller foam particles, foaming solution was spray gelled using a 2 micron nozzle and air atomized at 0.1 to 3 bar air pressure. The solution was either sprayed into calcium chloride solution or liquid nitrogen cooled tower. The foam bubbles had a mean diameter between 17-20 microns and had a range of 0.1 to 50 microns. Also 90% of bubbles had diameter less than 30 microns. Although some gas fraction was lost due to spraying the foam bubbles, size distribution remained unaffected by the process of spraying. The foam particles had a mean diameter of about 200 microns, with a range of about 1 to 1000 microns. The resultant particles had a gas fraction ranging from about 30% to 62%. Higher atomization air pressure resulted in loss of gas fraction from the particles. Upon suspending these particles in water at room temperature (20-25° C.), the foam particles remained stable without losing integrity for more than 30 days.

Foam particles created as described above can be mixed with viscous food products (with a viscosity between about 0.001 Pa·s and 200 Pa·s) to provide an aerated, viscous food product. In one embodiment, a viscous food product can be provided with a gas fraction of at least 10%, and in a preferred embodiment, between about 10% and 60%.

Figure 3:
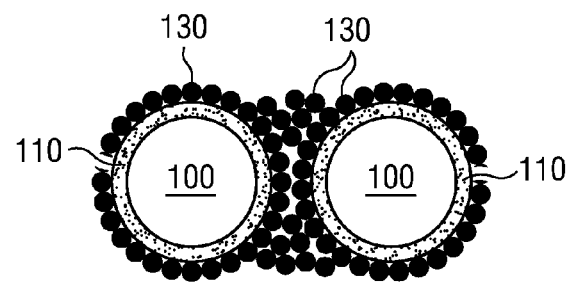
FIG. 3 depicts gel-stabilized foam bubbles of another embodiment of the present invention.

FIG. 3 depicts foam bubbles made according to another embodiment of the present invention. Each foam bubble depicted therein comprises a gas bubble 100 surrounded by a layer of foaming agent 110, which is then substantially surrounded by a plurality of minute gel particles. A stabilized foam created according to this embodiment of the present invention contains a plurality of such foam bubbles substantially surrounded by gel particles.

Figure 5:
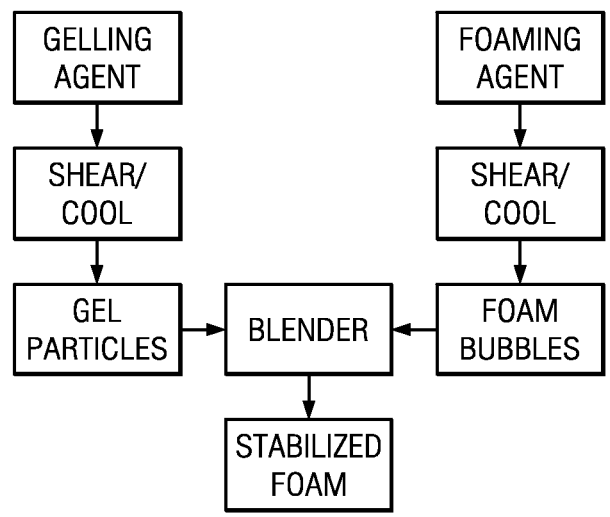
FIG. 5 is a flow chart depicting another embodiment of a method of making a gel-stabilized, viscous foam according to the present invention.

FIG. 5 is a flow chart for one embodiment of a method of making the foam bubbles depicted in FIG. 3. As shown therein, a solution containing a gelling agent (but no foaming agent or gas) is subjected to high shear and cooling, in a similar manner as the foaming solution was subjected to high shear and cooling, as described above. The other gel triggering mechanisms mentioned previously can also be used. In one embodiment, the concentration of the gelling agent in solution is between about 0.5% and 10%. The temperature reduction triggers the gelling process, and the high shear rate inside the mixing chamber produces minute gel particles. In a preferred embodiment, the shear rate inside the mixing chamber is at least 1 $s^{-1}$, and in a most preferred embodiment, the shear rate is between about 100 $s^{-1}$ and 1000 $s^{-1}$.

In a preferred embodiment, the gel particles are less than 20 microns in average diameter, and in a most preferred embodiment the gel particles are between about 0.1 microns and 10 microns. Other factors that influence the size of the gel particles include the specific gelling agent chosen, the residence time inside the high shear mixer, and the cooling rate of the gelling mixture. At any given concentration of the gelling material, rate of gelation and shear will determine the particle size. In temperature induced gelling, the rate of cooling governs the initiation, growth and reactivity of gel particle and rate of shear governs size of the particle. At a given shear rate and gelling agent concentration, a higher rate of cooling results in higher viscosity and produces larger particles, whereas a lower rate of cooling produces a lower viscosity gel and therefore smaller particles. At a high rate of cooling, gel particles tend to grow large before shear force can break them into smaller particles. At lower cooling rate there is enough shear force in the system to break the gel particles into smaller particles.

In the embodiment depicted in FIG. 5, a foam is created in a process separate from the process that creates the gel particles. In this aspect of the invention, a foaming agent solution is combined with air or other gas, and subjected to high shear, which creates non-stabilized foam bubbles. The foaming agent can be any foaming agent known in the art, or listed above.

The foam so created is stabilized by mixing the gel particles and foam bubbles in a blender. The blender causes the gel particles to surround and stabilize the foam bubbles, as depicted in FIG. 3. The gel particles and foam bubbles are mixed at relatively low shear in order to avoid bursting the non-stabilized foam bubbles. The foam stabilized by gel particles, in one embodiment, has a viscosity between about 0.001 Pa·s and 200 Pa·s.

The foam particles created according to the embodiment in FIGS. 2 and 4 is the preferred embodiment. The foam particles containing continuously gel coated foam bubbles provide more support to the bubbles, and are more amenable to mixing with viscous food products without destabilizing the bubbles. Such foam particles can be mixed with viscous food products in a standard mixing unit operation at ambient conditions, subject to the same shear rate limits as the foam production process described above. The embodiments depicted in FIGS. 3 and 5 were stable as a foam when stored at ambient conditions, but did not maintain their stability as well as the gel-stabilized foam particles when mixed with food products.

The foaming solution can also include at least one flavoring, taste enhancing, fragrance, aroma imparting, or seasoning component (referred to as a flavorant), which can be used to compliment the flavor of the viscous food product into which the foam particles are to be incorporated. Any flavorant included in the foaming solution must not adversely affect the foam stability. For example, a flavoring oil could be included in emulsion form with the foaming solution, such that pockets of flavoring oil are surrounded by the gel material of the particles. Additionally, an insoluble seasoning component could also be trapped within the gel portion of the particles. A flavorant which is soluble in the gelling solution could also be used if it does not adversely affect the final foam structure.

Examples 1-18

A series of gel-stabilized foam particles was created by combining a gelling agent solution, a foaming agent solution and a gas in a rotor-stator chamber. Table 1 below depicts the processing conditions used to create the gel-stabilized foam particles

| Gelling agent (wt. %) | Foaming Agent (wt. %) | Gas Fraction (%) |
|---|---|---|
| gellan gum (0.5) | whey protein (0.5) | ~35 |
| gellan gum (1.0) | whey protein (0.5) | ~35 |
| gellan gum (0.5) | whey protein (0.5) | ~35 |
| gellan gum (1.0) | whey protein (0.5) | ~35 |
| gellan gum (0.5) | whey protein (0.5) | ~35 |
| gellan gum (1.0) | hydrolyzed casein (1.0) | 44.7 |
| gellan gum (1.0) | hydrolyzed casein (0.5) | 59.3 |
| gellan gum (1.0) | whey protein isolate (0.5) | 25 |
| gellan gum (1.0) | acetam (2.0) | 0 |
| high acyl gellan gum (0.25) | Hydrolyzed casein (0.25) | 57.8 |
| high acyl gellan gum (0.25) | Whey protein (1.0) | 65 |
| high acyl gellan gum (0.25) | Whey protein isolate (0.25) | — |
| high acyl gellan gum (0.25) | Lactem (0.5) | — |
| Agar (1.5) | Hydrolyzed casein (0.5) | 54% |
| Agar (2.0) | Lactem (0.5) | 29% |
| Agar (1.5) | Whey protein (1.0) | 12% |
| Carrageenan (1.66) | Lactosylated whey protein (2.0) | 66% |
| Carrageenan (1.66) | Lactosylated whey protein (2.0) | 72% |

The foam gel particles created by each of the whey protein/gellan gum foaming solutions had a volumetric gas fraction of about 35%, and which was shelf stable for more than 12 days. The hydrolyzed casein foaming solutions produced foams which were shelf stable for about 3 days. The lactem foaming solutions produced foams which were shelf stable for at least 7 days. The high acyl gellan gum gelled immediately when combined with whey protein isolate and lactem at 75° C., but when combined with hydrolyzed casein and whey protein it produced good foams with high gas fractions. The combination of acetam and gellan gum did not aerate at all. The combination of agar and lactem produced a stable foam structure, whereas agar and whey protein produced an unstable dry foam. 72% gas fraction was obtained in a carrageenan and lactosylated whey protein system, and the particles resulting from such system was stable more than 15 days. In the examples above (except for agar containing samples) the pH was adjusted to 4.0. Also calcium and sodium chloride salts were added to gellan containing samples to get different gelling temperatures (between 37° C. to 50° C.).

Examples 19 and 20

Two gel stabilized foams were produced according to the embodiment depicted in FIG. 5. An egg white protein foam was mixed with gellan gum particles which were produced separately. The foaming solution was 1.5% egg white protein and had a pH of about 3.5. The gellan particles were created using a 1% gellan gum solution in a rotor stator mixing chamber. One of the foams had a gas fraction of about 40%, and the other had a gas fraction of about 60%. Both were shelf stable at ambient conditions (room temperature) for about 4 weeks, with the 60% gas fraction foam showing more disproportionation than the 40% gas fraction foam after that time.

Examples 21-24

A series of gel-stabilized foam particles was created by using air at different pressures to spray a solution of gelling agent and foaming agent into a 1% calcium chloride solution (at a pH of about 4.10). The foaming agent used was PGE, and the gelling agent used was gellan gum. At air pressures of 0.1 bar, 0.3 bar, 0.5 bar, and 1 bar, about 95% of the foam bubbles in the gel particles had diameters between 0.5 and 55 microns. At air pressures of 0.1 and 0.3 bar, about 90% of the foam particles had a size between about 100 microns and 1000 microns. At air pressures of 0.5 bar and 1 bar, about 90% of the foam particles had a size between about 40 microns and 100 microns. These gel-stabilized foam particles were washed with water, and left to float in water at room temperature. After 30 days, the particles remained floating on the top of the water and showed substantially no signs of degradation. The surprising stability of the particles indicates that they would remain stable for at least 180 days.

Example 25

Gel-stabilized foam particles were created by mixing calcium chloride (0.5%) with a foaming agent (1% PGE solution), foaming the solution, and then mixing the foamed solution with gellan gum. The final mixing step resulted in gelation of the mixture, which was converted into foam particles under shear. The resulting foam bubble and particle structure was similar in size and appearance to the foam particles made using PGE foaming solution containing no calcium chloride, and showed similar stability at room temperature.

Examples 26-27

Gel stabilized foam particles were mixed with a viscous food product (a dip) at weight ratios of Foam Particle:Dip of 0.91 (52.3% dip, 47.7% foam particle; 33% gas fraction) and 1.41 (26.2% dip, 73.8% foam particle; 38% gas fraction). The dip aerated by addition of these foam particles was lower in caloric density, and exhibited a texture and mouthfeel that was lighter, more airy, smoother than the same dip exhibited without the foam particle addition. The foamy texture of the dips remained stable for at least one week, but the dips had to be discarded due to microbial spoilage. Otherwise, the foam showed no signs of degradation.

It will now be evident to those skilled in the art that there has been described herein a gel-stabilized foam that can be used to improve viscous food products. Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

In sum, while this invention has been particularly shown and described with reference to a preferred embodiment, it will be understood by those skilled in the art that various changes, in form and detail may be made therein without departing from the spirit and scope of the invention.

What is claimed is:

1. A gel-stabilized foam comprising: a plurality of edible foam particles, wherein said foam particles have a mean diameter between about 1 and about 10,000 microns, wherein each said foam particle comprises a plurality of foam bubbles, and wherein said foam bubbles are surrounded by a continuous gel coating, wherein said foam further comprises a viscosity between about 0.001 Pa·s and 200 Pa·s and float in water.

2. The foam of claim 1 wherein said foam particles have a mean diameter between about 1 and about 1000 microns.

3. The foam of claim 1 wherein said foam particles have a mean diameter between about 1000 and about 10,000 microns.

4. The foam of claim 1 wherein each said foam bubble has a diameter between about 0.1 microns and 200 microns.

5. The foam of claim 1 wherein said foam particles comprise a gas fraction between about 10% and 90%.

6. The foam of claim 1 wherein said foam particles are stable at room temperature for at least 30 days.

7. The foam of claim 1 wherein said foam particles are stable at room temperature for at least 180 days.

8. A food product comprising: a viscous food having a viscosity between about 0.001 Pa·s and 200 Pa·s; and a plurality of foam particles mixed in said viscous food, wherein said foam particles comprise a mean diameter between about 1 micron and about 10,000 microns, wherein each said foam particle comprises a plurality of foam bubbles, wherein said foam bubbles are surrounded by a continuous gel coating, and wherein said foam particles further comprise a viscosity between about 0.001 Pa·s and 200 Pa·s and float in water.

9. The food product of claim 8 wherein said foam particles are stable for at least 180 days at room temperature.

10. The food product of claim 8 further comprising a gas fraction of at least about 10%.

11. The food product of claim 8 further comprising a gas fraction of between about 10% and about 60%.

12. The food product of claim 8 wherein said particles comprise a gas fraction of between 10% and 90%.

13. The food product of claim 8 wherein said particles comprise a mean diameter between about 1 micron and about 1,000 microns.

14. The food product of claim 8 wherein said particles comprise a mean diameter between about 1000 microns and about 10,000 microns.

15. The food product of claim 8 wherein each said foam bubble has a diameter between about 0.1 microns and 200 microns.

16. The food product of claim 15 wherein 90% of said foam bubbles have diameters less than 100 microns.

* * * * *